(12) United States Patent
Ieyasu et al.

(10) Patent No.: US 9,796,411 B2
(45) Date of Patent: Oct. 24, 2017

(54) ELECTRIC POWER STEERING APPARATUS

(71) Applicant: NSK LTD., Tokyo (JP)

(72) Inventors: Masahiro Ieyasu, Maebashi (JP); Masahiro Maeda, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/038,770

(22) PCT Filed: Apr. 7, 2015

(86) PCT No.: PCT/JP2015/060871
§ 371 (c)(1),
(2) Date: May 24, 2016

(87) PCT Pub. No.: WO2015/159762
PCT Pub. Date: Oct. 22, 2015

(65) Prior Publication Data
US 2017/0080969 A1    Mar. 23, 2017

(30) Foreign Application Priority Data

Apr. 16, 2014  (JP) ................................ 2014-084477

(51) Int. Cl.
*B62D 5/04*        (2006.01)
*B62D 6/00*        (2006.01)

(52) U.S. Cl.
CPC ......... *B62D 5/0463* (2013.01); *B62D 5/0466* (2013.01); *B62D 6/008* (2013.01)

(58) Field of Classification Search
CPC ..... B62D 5/0463; B62D 5/0466; B62D 6/008
(Continued)

(56) References Cited

U.S. PATENT DOCUMENTS

2003/0060960 A1\* 3/2003 Hartmann ............ B60K 31/047
                                                              701/70
2009/0192679 A1\* 7/2009 Kobayashi ........... B62D 5/0463
                                                              701/42

FOREIGN PATENT DOCUMENTS

JP   2008-087727 A   4/2008
JP   2008-114687 A   5/2008
(Continued)

OTHER PUBLICATIONS

International Search Report for PCT/JP2015/060871 dated Jul. 7, 2015 [PCT/ISA/210].
(Continued)

*Primary Examiner* — Redhwan k Mawari
*Assistant Examiner* — Rodney P King
(74) *Attorney, Agent, or Firm* — Sughrue Mion, PLLC

(57) ABSTRACT

[Problem]
An object of the present invention is to provide a high-performance electric power steering apparatus that reduces uncomfortable feeling of a driver by improving judgment of turning or returning and performing fine control of a steering state to improve a function of convergence control.
[Means for solving the problem]
An electric power steering apparatus comprises: a turning or returning state index calculating section that calculates a turning or returning state index based on a steering torque and a motor angle velocity; a turning or returning state ratio calculating section that calculates a turning or returning state ratio with a nominal value as a reference based on the turning or returning state index; and a convergence control section that comprises a sensitive gain section that calculates a turning gain and a returning gain based on the steering torque, a vehicle speed and the motor angle velocity, a gain correcting section that performs gain correction for the turning gain and the returning gain by the turning or return-
(Continued)

ing state ratio, and an output processing section that outputs a convergence control value by performing output processing of a gain signal from the gain correcting section based on an absolute value and a sign inversion signal of a yaw rate estimation value.

9 Claims, 10 Drawing Sheets

(58) Field of Classification Search
  USPC .......................................................... 701/42
  See application file for complete search history.

(56) References Cited

FOREIGN PATENT DOCUMENTS

| | | |
|---|---|---|
| JP | 2009-143490 A | 7/2009 |
| JP | 2009-149170 A | 7/2009 |
| JP | 2009-286350 A | 12/2009 |
| JP | 4715446 B2 | 7/2011 |
| WO | 2006/075775 A1 | 7/2006 |

OTHER PUBLICATIONS

Written Opinion for PCT/JP2015/060871 dated Jul. 7, 2015 [PCT/ISA/237].
International Preliminary Report on Patentability for PCT/JP2015/060871 dated Jul. 7, 2015 [PCT/ISA/409].

\* cited by examiner

PRIOR ART

| | PATTERN A | PATTERN B | PATTERN C |
|---|---|---|---|
| STEERING RETURNING | NEGATIVE | 0 | 0 |
| STEERING TURNING | 0 | POSITIVE | 0 |
| STEERING HOLDING | 0 | 0 | POSITIVE |

PRIOR ART

ELECTRIC POWER STEERING APPARATUS

CROSS REFERENCE TO RELATED APPLICATIONS

This application is a National Stage of International Application No. PCT/JP2015/060871 filed Apr. 7, 2015, claiming priority based on Japanese Patent Application No. 2014-084477 filed Apr. 16, 2014, the contents of all of which are incorporated herein by reference in their entirety.

TECHNICAL FIELD

The present invention relates to an electric power steering apparatus that provides a steering system of a vehicle with an assist torque by means of a motor, and in particular to a high-performance electric power steering apparatus that enables more comfortable steering feeling by making judgment on control of turning or returning analog to reduce uncomfortable feeling of a driver and improving convergence control.

BACKGROUND ART

An electric power steering apparatus which provides a steering mechanism of a vehicle with a steering assist torque by means of a rotational torque of a motor, applies a driving force of the motor as the steering assist torque to a steering shaft or a rack shaft by means of a transmission mechanism such as gears or a belt through reduction gears. In order to accurately generate the steering assist torque, such a conventional electric power steering apparatus (EPS) performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1, and a motor 20 for assisting a steering force of the steering wheel 1 is connected to the column shaft 2 through the reduction gears 3. The electric power is supplied to a control unit (ECU) 100 for controlling the electric power steering apparatus from a battery 13, and an ignition key signal is inputted into the control unit 100 through an ignition key 11. The control unit 100 calculates a current command value of an assist (steering assist) command on the basis of a steering torque T detected by the torque sensor 10 and a vehicle speed V detected by a vehicle speed sensor 12, and controls a current supplied to the motor 20 on the basis of a current control value E obtained by performing compensation or the like with respect to the calculated current command value. Moreover, it is possible to receive the vehicle speed V from a controller area network (CAN) or the like.

In such an electric power steering apparatus, the control unit 100 mainly comprises a CPU (including an MPU and an MCU), and general functions performed by programs within the CPU are, for example, shown in FIG. 2.

The functions and the operation of the control unit 100 will be described with reference to FIG. 2. As shown in FIG. 2, the steering torque T from the torque sensor 10 is inputted into a current command value calculating section 101, and at the same time, is also inputted into a steering state judging section 120. The vehicle speed V from the vehicle speed sensor 12 is inputted into the current command value calculating section 101, and at the same time, is also inputted into a vehicle speed sensitive gain section 123. A current command value Iref calculated on the basis of the steering torque T and the vehicle speed V in the current command value calculating section 101 is addition-inputted into a subtracting section 102.

A self-aligning torque (SAT) SAT1 detected or estimated in a self-aligning torque section 140 is inputted into a multiplying section 124. A vehicle speed sensitive gain $G_1$ is set on the basis of the vehicle speed V in the vehicle speed sensitive gain section 123. The vehicle speed sensitive gain $G_1$ from the vehicle speed sensitive gain section 123 is also inputted into the multiplying section 124. An output SAT1·$G_1$ from the multiplying section 124 is inputted into a multiplying section 125.

In the meantime, a measured or estimated motor angle velocity ω is inputted into the steering state judging section 120. The steering state judging section 120 judges a steering state, which is steering turning, steering returning or steering holding, on the basis of the steering torque T and the motor angle velocity ω, and inputs a judgment signal as the result of judgment into a steering state sensitive gain section 121.

The judgment of the steering state is, for example, performed according to a flowchart shown in FIG. 3. First, the steering state judging section 120 judges whether the motor angle velocity ω continues to be a same value (or a value within a certain range) for a certain time (Step S100), and the steering state is judged the steering holding when it is judged that it has continued (Step S105). The steering state is judged the steering when it is judged that it has not continued (Step S101), and moreover the steering state judging section 120 judges whether a sign of the steering torque T is identical to a sign of the motor angle velocity ω (Step S102). The steering state is judged the steering turning when it is judged that the sign of the steering torque T is identical to the sign of the motor angle velocity ω (Step S104). The steering state is judged the steering returning when it is judged that the sign of the steering torque T is not identical to the sign of the motor angle velocity ω (Step S103).

The steering state sensitive gain section 121 switches a steering state sensitive gain $G_2$ on the basis of the judgment signal from the steering state judging section 120. In other words, the steering state sensitive gain $G_2$ outputted from the steering state sensitive gain section 121 to the multiplying section 125 is switched according to the judgment signal from the steering state judging section 120. For example, several patterns of combination as follows are possible in the steering state sensitive gain section 121: a pattern (A) of "making the steering state sensitive gain $G_2$ function only in returning a steering wheel" is that the steering state sensitive gain $G_2$ is negative when the steering state is judged the steering returning, the steering state sensitive gain $G_2$ is 0 when the steering state is judged the steering turning, and the steering state sensitive gain $G_2$ is 0 when the steering state is judged the steering holding; a pattern (B) of "making the steering state sensitive gain $G_2$ function only in turning a steering wheel" is that the steering state sensitive gain $G_2$ is 0 when the steering state is judged the steering returning, the steering state sensitive gain $G_2$ is positive when the steering state is judged the steering turning, and the steering state sensitive gain $G_2$ is 0 when the steering state is judged the steering holding; and a pattern (C) of "making the steering state sensitive gain $G_2$ function only in holding a steering wheel" is that the steering state sensitive gain $G_2$ is 0 when the steering state is judged the steering returning, the steering state sensitive gain $G_2$ is 0 when the steering state is judged the steering turning, and the steering state sensitive gain $G_2$ is positive when the steering state is judged the steering holding. These can be summarized as shown in FIG. 4

An output $SAT1 \cdot G_1 \cdot G_2$ from the multiplying section 125 is inputted into a multiplying section 131. Further, a co-sensitive gain $G_3(\omega)$ set in a $\omega$-sensitive gain section 130 is also inputted into the multiplying section 131. An output $SAT1 \cdot G_1 \cdot G_2 \cdot G_3(\omega)$ from the multiplying section 131 is inputted into a multiplying section 133. A steering torque sensitive gain $G_4$ (T) set in a steering torque sensitive gain section 132 is also inputted into the multiplying section 133. An output $SAT1 \cdot G_1 \cdot G_2 \cdot G_3(\omega) \cdot G_4(T)$ from the multiplying section 133 is inputted into a multiplying section 135. A steering angle sensitive gain $G_5(\theta)$ set in a steering angle sensitive gain section 134 is also inputted into the multiplying section 135. A SAT compensation value SATc being an output $SAT1 \cdot G_1 \cdot G_2 \cdot G_3(\omega) \cdot G_4(T) \cdot G_5(\theta)$ from the multiplying section 135 is inputted into the subtracting section 102. A subtraction result (Iref−SATc) in the subtracting section 102 is inputted into an adding section 103 as a current command value Iref1, and a compensation signal CM from a compensating section 110 for improving a characteristic is also inputted into the adding section 103.

The compensating section 110 adds an inertia compensation value 111 and a convergence control value 112 in an adding section 113, and inputs the addition result as the compensation signal CM into the adding section 103. An addition result (Iref1+CM) in the adding section 103 is inputted as a current command value Iref2 into a subtracting section 104, and the motor 20 is controlled through a PI control section 105, PWM control section 106 and an inverter 107. The convergence control is braking an action that a steering wheel sways and turns in order to improve convergence of a yaw of a vehicle. For example, it is performed by detecting a change rate of a yaw rate of a vehicle and giving damping to the yaw rate on the basis of the change rate as disclosed in Japanese Published Unexamined Patent Application No. 2000-95132 A.

In this way, the electric power steering apparatus changes a direction of a vehicle by a driver turning or returning a steering wheel. However, there are only two values of turning and returning, and in that case, the two values causes a large variety of chattering, which may give uncomfortable feeling (a torque ripple, a vibration, an abnormal noise, catching or the like) to the driver.

THE LIST OF PRIOR ART DOCUMENTS

Patent Documents

Patent Document 1: Japanese Published Unexamined Patent Application No. 2009-286350 A
Patent Document 2: Japanese Published Unexamined Patent Application No. 2008-087727 A
Patent Document 3: Japanese Patent No. 4715446 B2

SUMMARY OF THE INVENTION

Problems to be Solved by the Invention

There is an art, as described above, shown in the publication of Japanese Patent No. 4715446 B2 (Patent Document 3) as a prior art for achieving good steering feeling. The electric power steering apparatus shown in Patent Document 3 appropriately sets the SAT compensation value SATc that compensates the self-aligning torque (SAT) on the basis of the steering state (the steering turning, the steering returning, or the steering holding), the motor angle velocity, the steering angle, and the steering torque. Providing the steering angle sensitive gain and the steering torque sensitive gain enables design of the SAT compensation value that is appropriate to each case of on-center where the SAT is small and off-center where the SAT is large. Further, judging the steering state (the steering turning, the steering returning, or the steering holding) enables design of the SAT compensation value in the case of the steering holding in Patent Document 3.

However, the judgment of the steering state performed by the apparatus in Patent Document 3 uses only a state flag, which has three values of turning, returning and holding. In that case, the three values causes a large variety of chattering, which may give uncomfortable feeling to a driver. Further, the apparatus also uses the same judgment of the steering state in the convergence control. The convergence control can need enough control amount in order to control an amount in a steering wheel returning. In this convergence control performing switching a gain corresponding to the steering state (turning or returning), chattering occurring in judgment of the steering state causes sudden change of an output of the convergence control, and gives uncomfortable feeling to the driver.

The present invention has been developed in view of the above-described circumstances, and the object of the present invention is to provide a high-performance electric power steering apparatus that reduces uncomfortable feeling of a driver by improving the judgment of turning or returning which is the steering state and performing fine control of the steering state to improve a function of the convergence control.

Means for Solving the Problems

The present invention relates to an electric power steering apparatus that calculates a current command value based on a steering torque and a vehicle speed, drives and controls a motor which assists and controls a steering system based on said current command value, and has a function of convergence control of correcting said current command value, the above-described object of the present invention is achieved by that comprising: a turning or returning state index calculating section that calculates a turning or returning state index being analog based on said steering torque and a motor angle velocity; a turning or returning state ratio calculating section that calculates a turning or returning state ratio being analog with a variable nominal value as a reference based on said turning or returning state index; and a convergence control section that comprises a sensitive gain section that calculates a turning gain and a returning gain based on said steering torque, said vehicle speed and said motor angle velocity, a gain correcting section that performs gain correction for said turning gain and said returning gain by said turning or returning state ratio, and an output processing section that outputs a convergence control value by performing output processing of a gain signal from said gain correcting section based on an absolute value and a sign inversion signal of a yaw rate estimation value; wherein a characteristic of said turning or returning state ratio calculating section is that said nominal value is variable between 0.0 and 1.0, the turning or returning state ratio calculating section makes said turning or returning state ratio smaller than said nominal value with making a positive region of said turning or returning state index a turning state, the turning or returning state ratio calculating section makes said turning or returning state ratio larger than said nominal value with making a negative region of said turning or returning state index a returning state, and said turning or returning state ratio changes continuously and nonlinearly.

Further, the above-described object of the present invention is more effectively achieved by that wherein said turning or returning state index calculating section comprises an LPF that inputs said steering torque, an angle velocity index calculating section that calculates an angle velocity index ranging between ±1.0 based on said motor angle velocity, and a first multiplying section that outputs said turning or returning state index by multiplying an output of said LPF and said angle velocity index; or wherein said angle velocity index calculating section has a characteristic having a constant value when an absolute value of said motor angle velocity is larger than or equal to a predetermined value and changing linearly or nonlinearly when the absolute value of said motor angle velocity is smaller than said predetermined value; or wherein said gain correcting section comprises a second multiplying section that multiplies said returning gain and said turning or returning state ratio, a subtracting section that subtracts said turning or returning state ratio from a fixed value, a third multiplying section that multiplies a subtraction result from said subtracting section and said turning gain, and an adding section that adds a multiplication result of said second multiplying section and a multiplication result of said third multiplying section; or wherein said output processing section comprises an absolute value section that obtains an absolute value of said yaw rate estimation value, a sign inverting section that inverts a sign of said yaw rate estimation value, a fourth multiplying section that multiplies said absolute value and an addition result of said adding section, and a fifth multiplying section that multiplies an output of said sign inverting section and a multiplication result of said fourth multiplying section, and said fifth multiplying section outputs said convergence control value.

Effects of the Invention

The electric power steering apparatus of the present invention can set a turning or returning state ratio corresponding to the steering state because of outputting the turning or returning state ratio by making the judgment of the steering state an analog map. It is possible to change the turning or returning state ratio appropriately by freely changing a nominal value and to achieve steering feeling with a high degree of freedom.

Further, the apparatus inputs the turning or returning state ratio into the convergence control section, overrides it to the output of the sensitive gain section, and outputs the convergence control value by combining the processing of the yaw rate estimation value (or the detected yaw rate value), so that the flag for judging the steering state being an analog value enables finer convergence control corresponding to the steering state (the turning or returning state). Thus, it is possible to achieve even better steering feeling by reducing uncomfortable feeling (a torque ripple, a vibration, an abnormal noise, catching or the like) of a driver.

BRIEF DESCRIPTION OF THE DRAWINGS

In the accompanying drawings.

MODE FOR CARRYING OUT THE INVENTION

The present invention aims at improvement of judgment of a steering state and improvement of a control system, and outputs a turning or returning state ratio by making the judgment of the steering state not a flag state but an analog map. The present invention judges the steering state from a steering torque (or a steering angle) and a motor angle velocity, and sets the turning or returning state ratio corresponding to the steering state. The turning or returning state ratio can be changed centered at a nominal value in a state of not steering (a steering holding state). For example, the present invention outputs the turning or returning state ratio centered at the nominal value of 0.5 when setting 0.5 on the nominal value. Further, it is also possible to shift the nominal value. For example, it is possible to quickly transfer to a turning state (the closer to 0 the nominal value is, the more deeply the steering state enters a turning side) when setting 0.3 on the nominal value, and it is possible to quickly transfer to a returning state (the closer to 1 the nominal value is, the more deeply the steering state enters a returning side) when setting 0.7 on the nominal value, so that it is possible to achieve steering performance with a high degree of freedom easily.

The present invention inputs the turning or returning state ratio into a convergence control section, overrides it to each output of a conventional sensitive gain section, performs conventional output processing including multiplication of an absolute value, a sign and the like of a yaw rate estimation value (a detected yaw rate value), and the like, and outputs a convergence control value.

Such a configuration makes a flag of the judgment of the steering state an analog value, which enables finer control corresponding to the steering state, so that it is possible to reduce uncomfortable feeling (a torque ripple, a vibration, an abnormal noise, and catching) of a driver and to achieve even better steering feeling.

Hereinafter, an embodiment of the present invention will be described in detail with reference to the accompanying drawings.

Figure 1:
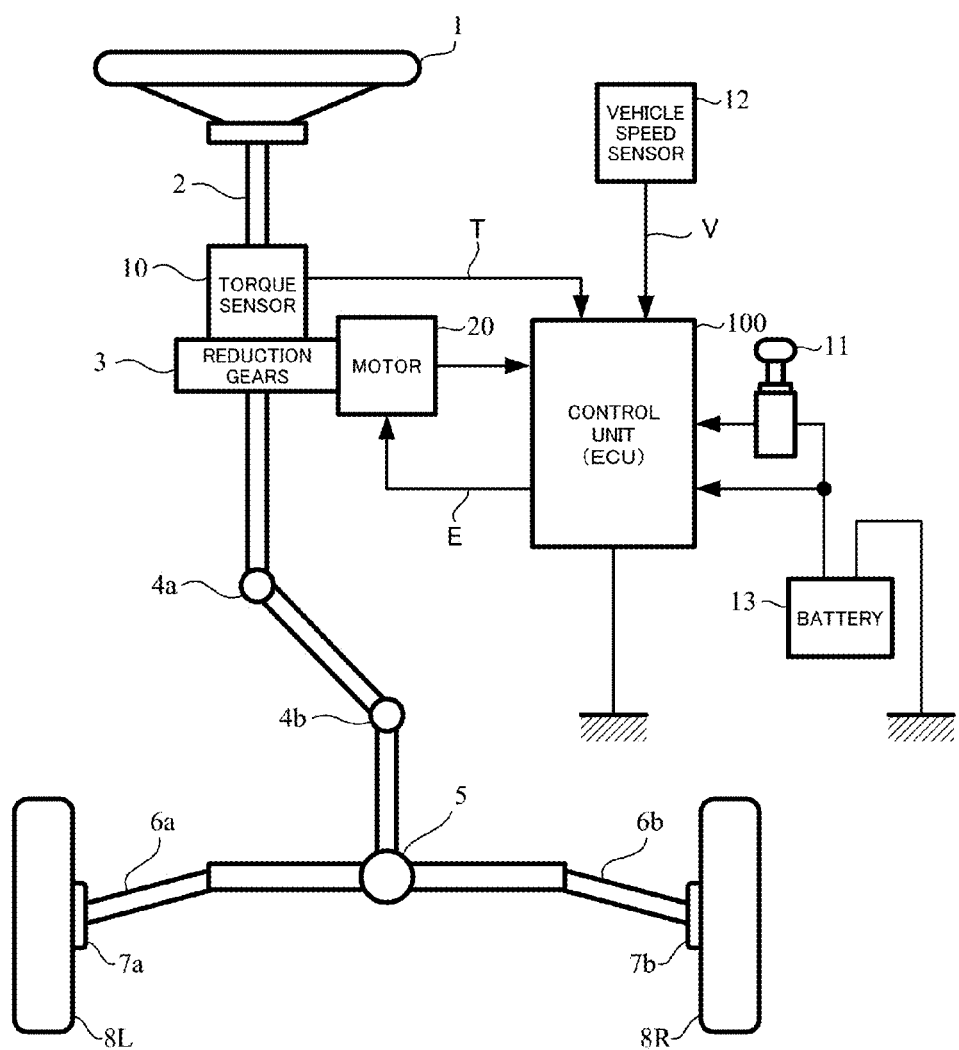
FIG. 1 is a configuration diagram illustrating a general outline of an electric power steering apparatus.
Figure 2:
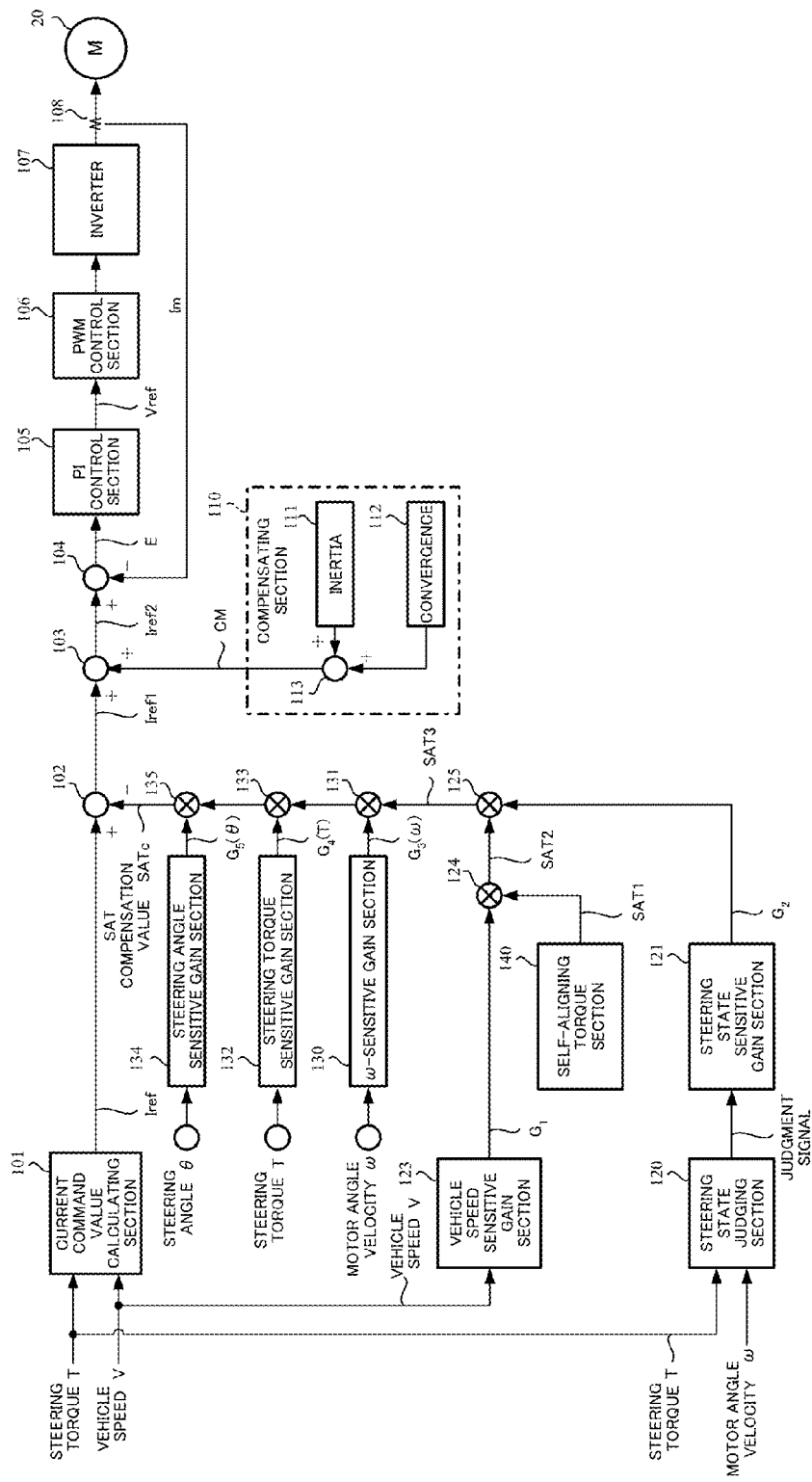
FIG. 2 is a block diagram showing a configuration example of a control system of the electric power steering apparatus.
Figures 3, 4:
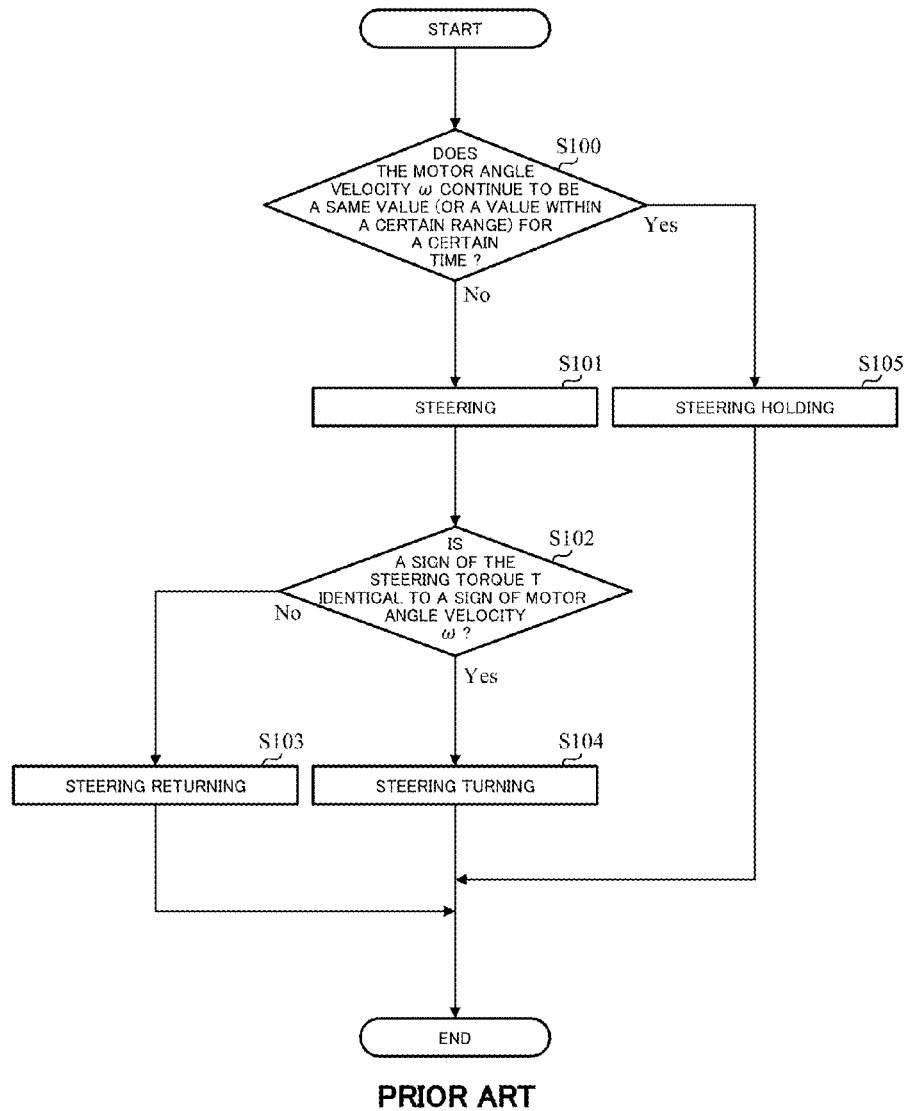
FIG. 3 is a flowchart showing a judgment example of turning or returning.
FIG. 4 is a pattern diagram for describing the judgment of turning or returning.
Figure 5:
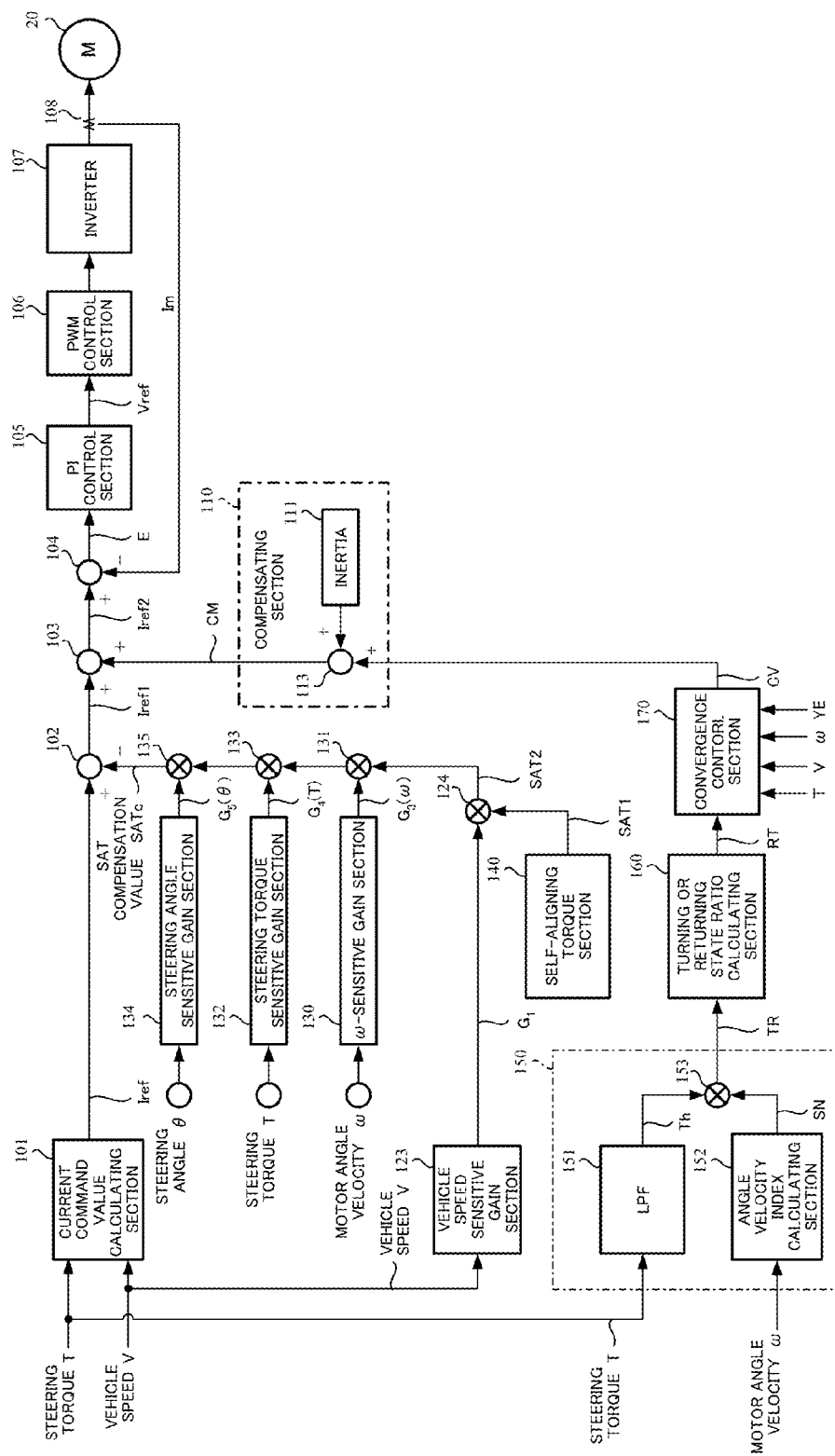
FIG. 5 is a block diagram showing a configuration example of the present invention.

FIG. 5 is a block diagram showing a configuration example of the present invention as corresponding to FIG. 2. A turning or returning state index calculating section 150 that inputs a steering torque T and a motor angle velocity ω, and calculates a turning or returning state index TR; a turning or returning state ratio calculating section 160 that calculates and outputs a turning or returning state ratio RT by the turning or returning state index TR; and a convergence control section 170 that inputs the turning or returning state ratio RT, the steering torque T, a vehicle speed V, the motor angle velocity ω, and a yaw rate estimation value YE, and outputs a convergence control value CV are provided anew.

Figure 6:
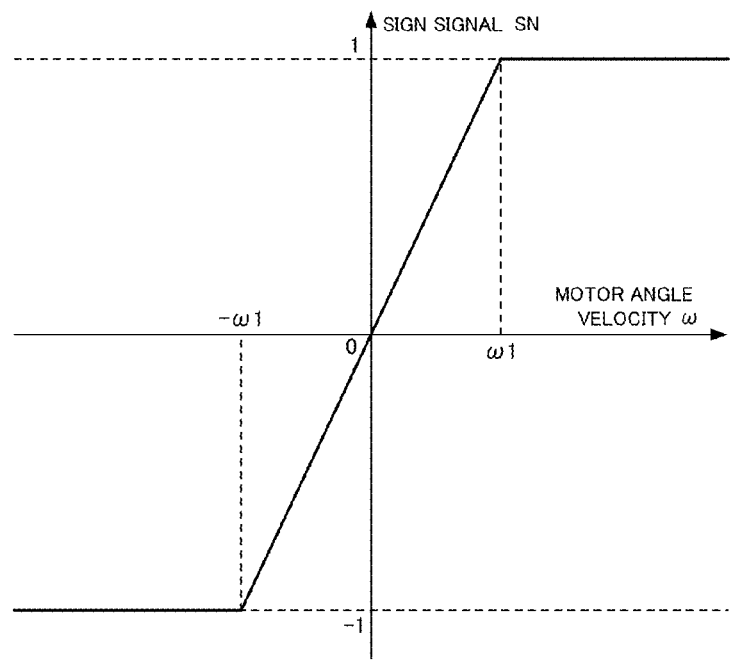
FIG. 6 is a diagram showing a characteristic example of an angle velocity index calculating section of the present invention.

The turning or returning state index calculating section 150 comprises a low pass filter (LPF) 151 for suppressing high-frequency vibration near zero of the steering torque T, an angle velocity index calculating section 152 for suppressing high-frequency vibration near zero of the motor angle velocity ω, and a multiplying section 153 for multiplying a steering torque Th from the LPF 151 and a sign signal SN from the angle velocity index calculating section 152. An input and output characteristic of the angle velocity index calculating section 152 is as shown in FIG. 6. The sign signal SN increases linearly until a motor angle velocity ω1 with respect to positive input of the motor angle velocity ω, becomes a constant value of 1.0 when the motor angle velocity ω is larger than or equal to the motor angle velocity ω1, decreases linearly until a motor angle velocity −ω1 with respect to negative input of the motor angle velocity ω, and becomes a constant value of −1.0 when the motor angle velocity ω is smaller than or equal to the motor angle velocity −ω1.

Further, the turning or returning state index TR being an output from the multiplying section 153 in the turning or returning state index calculating section 150 is inputted into the turning or returning state ratio calculating section 160. The turning or returning state ratio RT calculated in the turning or returning state ratio calculating section 160 is inputted into the convergence control section 170.

Figure 7:
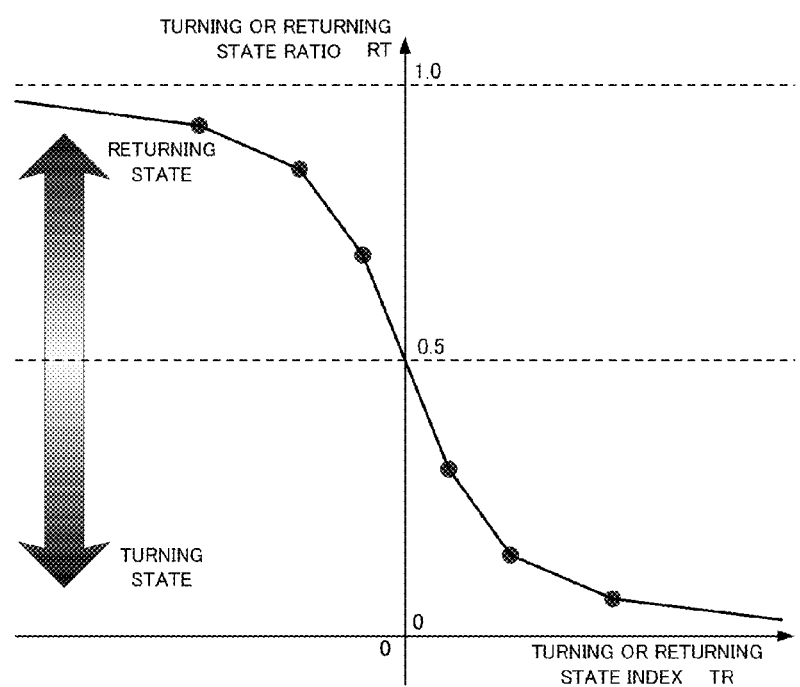
FIG. 7 is a diagram showing a characteristic example of a turning or returning state ratio calculating section of the present invention.

The turning or returning state ratio calculating section 160 has a characteristic as shown in FIG. 7. The turning or returning state ratio calculating section 160 sets 0.5 (50%) on the turning or returning state ratio RT (the nominal value) in not steering, in other words, in the case that the turning or returning state index TR is 0, judges the positive side of the turning or returning state index TR to be the turning state, and judges the negative side of the turning or returning state index TR to be the returning state. In the returning state, the turning or returning state ratio RT gradually decreases from saturation (almost 1.0) as the turning or returning state index TR approaches 0 on the negative side, and in the turning state, the turning or returning state ratio RT also gradually decreases until saturation (almost 0) as the turning or returning state index TR becomes larger from 0.

Figure 8:
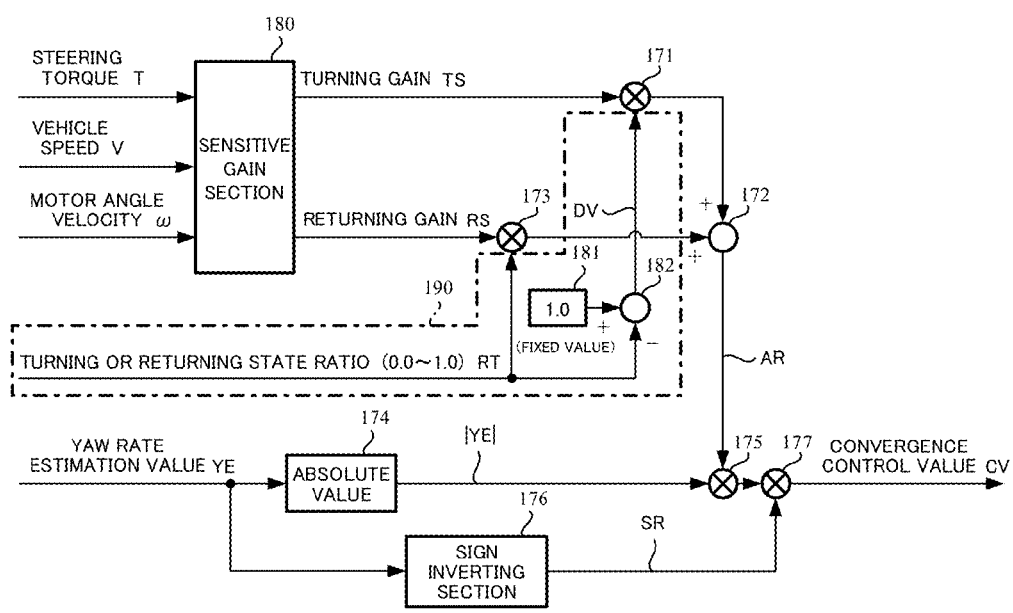
FIG. 8 is a block diagram showing a configuration example of a convergence control section of the present invention.

The convergence control section 170 is configured as shown in FIG. 8. The vehicle speed V, the motor angle velocity ω and the steering torque T are inputted into a sensitive gain section 180, a turning gain TS calculated in the sensitive gain section 180 is inputted into a multiplying section 171, and a returning gain RS is inputted into a multiplying section 173. The sensitive gain section 180 calculates the turning gain TS in turning a steering wheel and the returning gain RS in returning a steering wheel by a technique, for example, shown in the publication of Japanese Patent No. 3137847 B2. Further, the turning or returning state ratio RT calculated as described above is inputted into the multiplying section 173 in a gain correcting section, at the same time, is subtraction-inputted into a subtracting section 182, and a deviation DV between a fixed value (1.0) 181 and the turning or returning state ratio RT is inputted into the multiplying section 171. Further, a multiplication result (=TS·DV) of the multiplying section 171 is inputted into an adding section 172, a multiplication result (=RS·RT) of the multiplying section 173 is also inputted into the adding section 172, and an addition result AR of the adding section 172 is inputted into a multiplying section 175.

Furthermore, the yaw rate estimation value YE is made an absolute value by an absolute value section 174 in an output processing section, the absolute value |YE| of the yaw rate estimation value YE is inputted into the multiplying section 175, and a multiplication result (=AR·|YE|) is inputted into a multiplying section 177. The yaw rate estimation value YE is inputted into a sign inverting section 176, and a positive or negative sign SR of the yaw rate estimation value YE which is inverted (multiplied by −1) is inputted into the multiplying section 177. In other words, the positive or negative sign SR is "−1" when the yaw rate estimation value YE is positive, and the positive or negative sign SR is "+1" when the yaw rate estimation value YE is negative. A multiplication result of the multiplying section 177 is inputted as the convergence control value CV into an adding section 113 in a compensating section 110 of a control system.

Moreover, the gain correcting section comprises the multiplying sections 171 and 173, the subtracting section 182, and the adding section 172. The output processing section comprises the absolute value section 174, the sign inverting section 176, and the multiplying sections 175 and 177.

Figure 9:
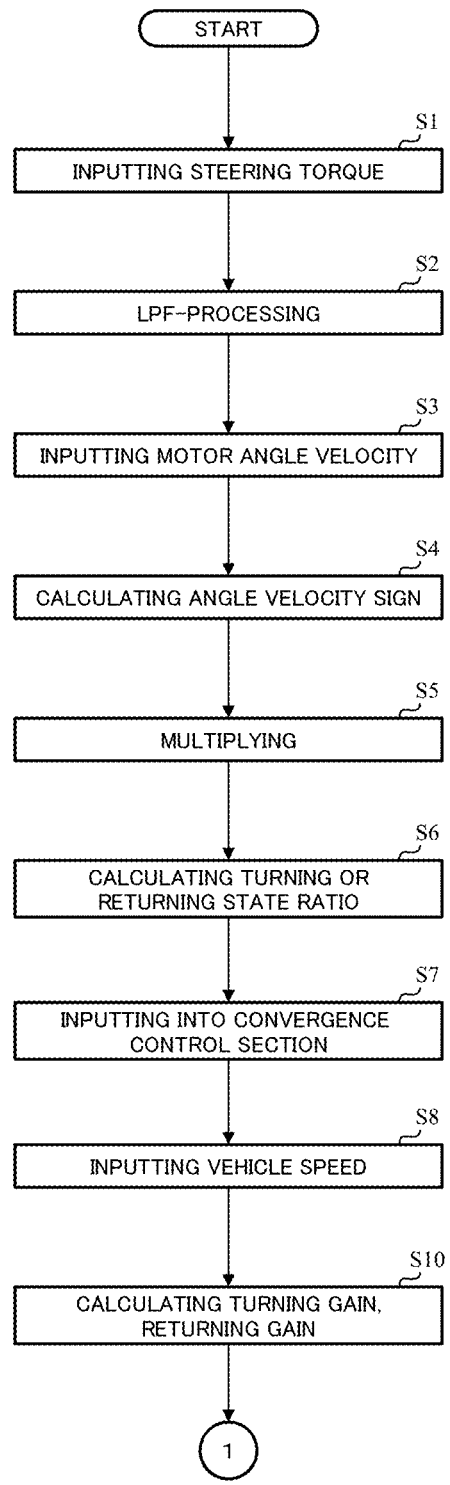
FIG. 9 is a flowchart showing an operating example, which is a part, of the present invention.
Figure 10:
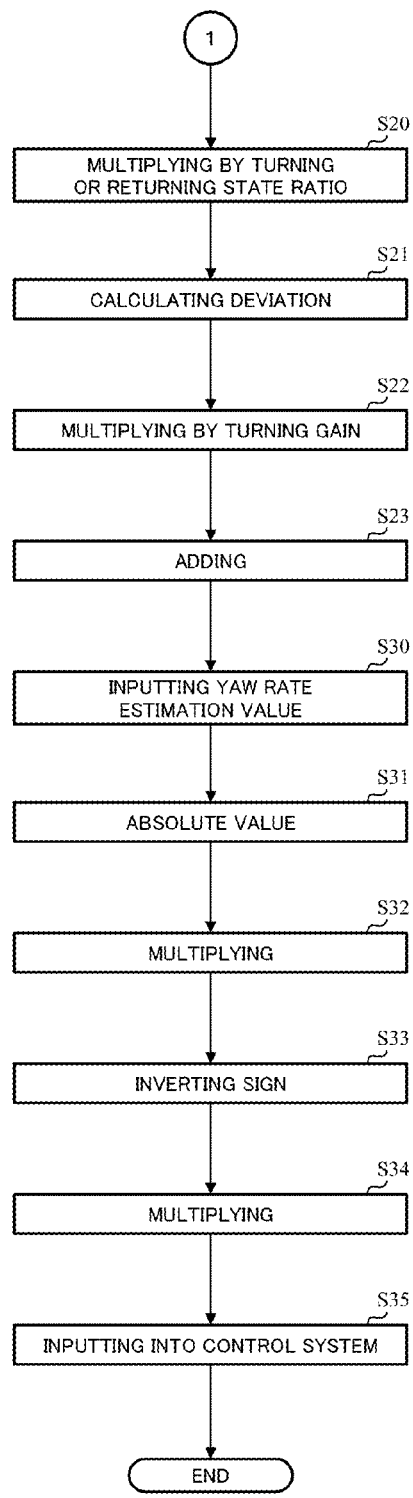
FIG. 10 is a flowchart showing an operating example, which is a part, of the present invention.

An operation example of such a configuration will be described with reference to flowcharts shown in FIG. 9 and FIG. 10.

First, the apparatus inputs the steering torque T detected by a torque sensor 10 (Step S1), and the LPF 151 performs LPF-processing (Step S2). Next, the apparatus inputs the calculated motor angle velocity ω (Step S3), the angle velocity index calculating section 152 calculates an angle velocity sign (Step S4). Moreover, the operation including the input of the steering torque T and the LPF-processing and the operation including the input of the motor angle velocity ω and the calculation of the angle velocity sign are in arbitrary order.

The steering torque Th gotten by performing the LPF-processing and the sign signal SN calculated in the angle velocity index calculating section 152 are inputted and multiplied in the multiplying section 153 (Step S5). The multiplication result is inputted as the turning or returning state index TR into the turning or returning state ratio calculating section 160, where the turning or returning state ratio RT is calculated by the characteristic shown in FIG. 7 (Step S6). The calculated turning or returning state ratio RT is inputted into the sensitive gain section 180 in the convergence control section 170 (Step S7). Furthermore, the vehicle speed V is also inputted into the sensitive gain section 180 (Step S8).

The turning gain TS and the returning gain RS are calculated in the sensitive gain section 180 (Step S10), the returning gain RS is multiplied by the turning or returning state ratio RT in the multiplying section 173 (Step S20), and the deviation DV between the turning or returning state ratio RT and the fixed value (1.0) is calculated (Step S21). The deviation DV is inputted into the multiplying section 171, and is multiplied by the turning gain TS (Step S22). The multiplication result of the multiplying section 171 and the multiplication result of the multiplying section 173 are added in the adding section 172, and the addition result AR is inputted into the multiplying section 175 (Step S23).

Further, the yaw rate estimation value (or the detected value) YE is inputted (Step S30). The yaw rate estimation value YE is made the absolute value in the absolute value section 174, and is inputted into the multiplying section 175 (Step S31), where the absolute value is multiplied by the addition result AR and is inputted into the multiplying section 177 (Step S32). Further, the yaw rate estimation value YE is inputted into the sign inverting section 176, where its sign is inverted (the positive or negative sign*(−1)) (Step S33). The inverted sign is multiplied in the multiplying section 177 by the multiplication result from the multiplying section 175 (Step S34), and is inputted as the convergence control value CV into the control system (Step S35).

In this way, the electric power steering apparatus of the present invention generates the steering state by using the steering torque and the motor angle velocity, and sets the turning or returning state ratio (which is an analog value) to be reflected in the control value for this steering state. This enables the apparatus to set an arbitrary characteristic for the steering state, and enables adaptation corresponding to a vehicle.

Figure 11A:
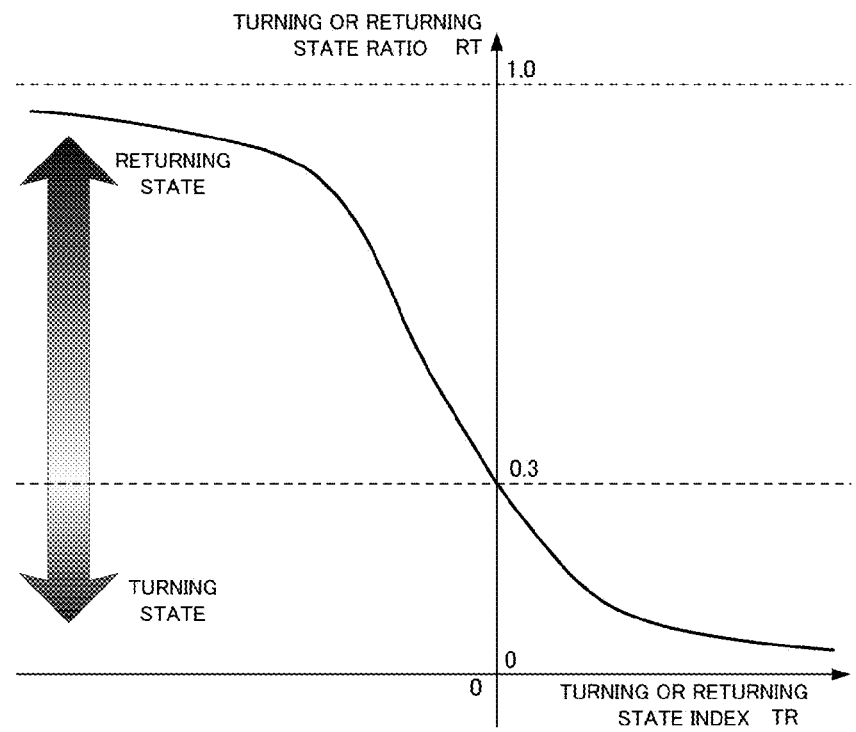
FIGS. 11A and 11B are characteristic diagrams for describing setting of a nominal value and judgment of a turning or returning state.
Figure 11B:
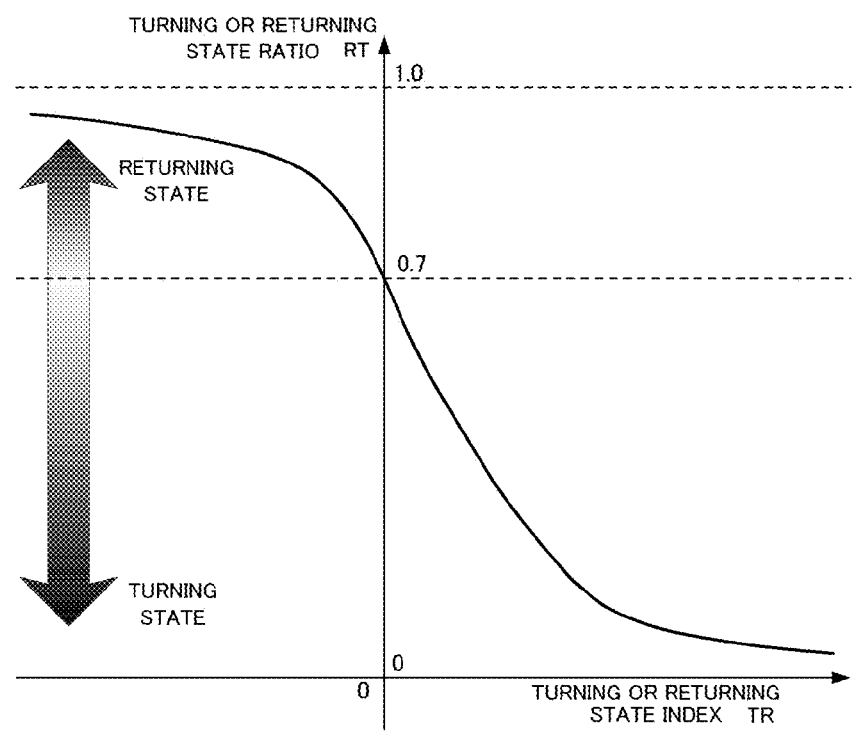

The turning or returning state ratio calculating section 160 in the above example sets 0.5 (50%) on the nominal value being the turning or returning state ratio RT in not steering as shown in FIG. 7. However, it is possible to set the nominal value in the turning side by setting 0.3 (30%) on the nominal value as shown in FIG. 11A, and to set the nominal value in the returning side by setting 0.7 (70%) on the nominal value as shown in FIG. 11B.

Figure 12A:
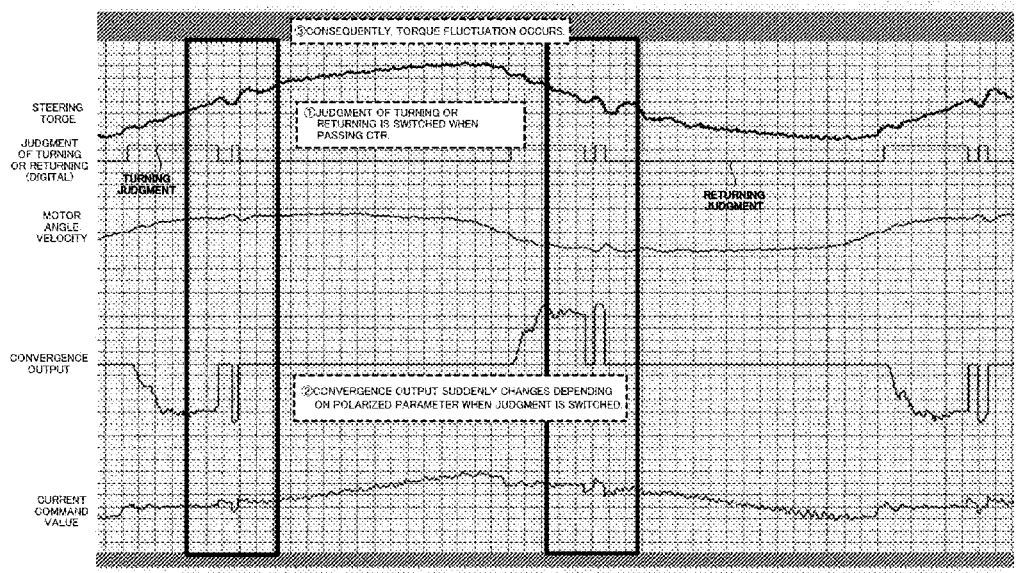
FIGS. 12A and 12B are waveform diagrams showing an effect of the present invention as compared with a conventional example.
Figure 12B:
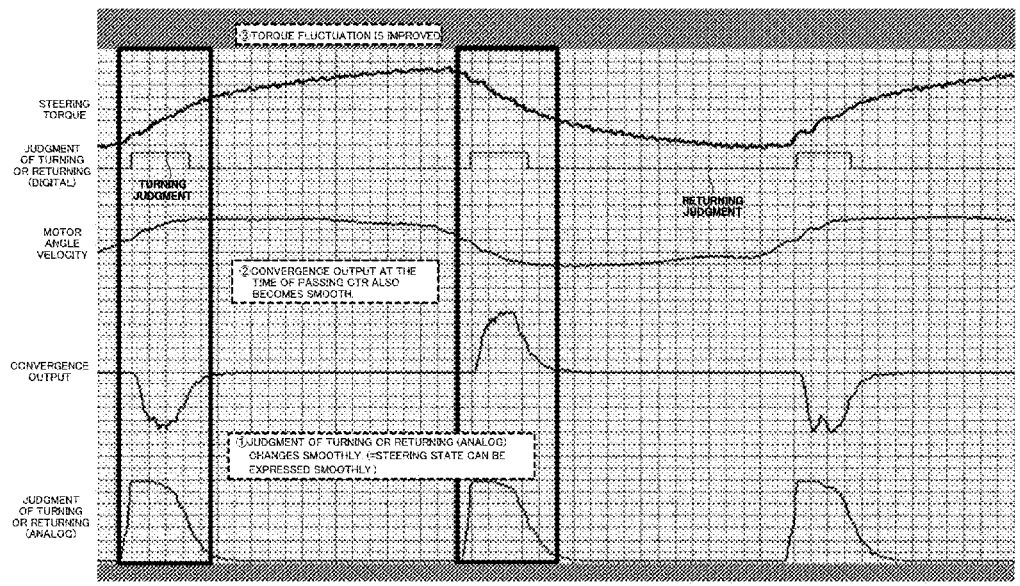

FIGS. 12A and 12B are waveform diagrams describing an effect of the present invention. FIG. 12A shows a result before improvement, and FIG. 12B shows a result of the present invention. In both diagrams, the uppermost stage shows a waveform of the steering torque, the next stage shows judgment of the turning or returning (which is digital), the third stage shows the motor angle velocity, the fourth stage shows the convergence output, and the lowermost stage shows a current command value. The following is found out by comparing FIGS. 12A and 12B: the present invention removes chattering occurring in judgment of turning or returning, and removes sudden change of the convergence output, so that the present invention does not give uncomfortable feeling to a driver, and gives comfortable steering feeling. Moreover, "CTR" in FIGS. 12A and 12B means a position of a steering wheel when a vehicle goes straight.

Moreover, in the above embodiment, the sign signal SN from the angle velocity index calculating section 152 linearly changes between the motor angle velocities ±ω1 for the input of the motor angle velocity ω, but it may changes nonlinearly, or may changes asymmetrically.

EXPLANATION OF REFERENCE NUMERALS

1 steering wheel
2 column shaft (steering shaft, handle shaft)
10 torque sensor
12 vehicle speed sensor
13 battery
20 motor
100 control unit (ECU)
101 current command value calculating section
105 PI control section
106 PWM control section
107 inverter
110 compensating section
120 steering state judging section
121 steering state sensitive gain section
140 self-aligning torque (SAT) section
150 turning or returning state index calculating section
151 low pass filter (LPF)
152 angle velocity index calculating section
160 turning or returning state ratio calculating section
170 convergence control section
180 sensitive gain section

The invention claimed is:

1. An electric power steering apparatus that calculates a current command value based on a steering torque and a vehicle speed, drives and controls a motor which assists and controls a steering system based on said current command value, and has a function of convergence control of correcting said current command value, comprising:
   a hardware controller which controls said motor and which executes the following operations:
   calculates a turning or returning state index being analog based on said steering torque and a motor angle velocity;
   calculates a turning or returning state ratio being analog with a variable nominal value as a reference based on said turning or returning state index; and
   calculates a turning gain and a returning gain based on said steering torque, said vehicle speed and said motor angle velocity, performs gain correction for said turning gain and said returning gain by said turning or returning state ratio, and outputs a convergence control value by performing output processing of a gain signal based on an absolute value and a sign inversion signal of a yaw rate estimation value;
   wherein said nominal value is variable between 0.0 and 1.0, said turning or returning state ratio is smaller than said nominal value with making a positive region of said turning or returning state index a turning state, said turning or returning state ratio is larger than said nominal value with making a negative region of said turning or returning state index a returning state, and said turning or returning state ratio changes continuously and nonlinearly; and
   wherein said hardware controller drives and controls said motor based on said current command value corrected by said convergence control value.

2. The electric power steering apparatus according to claim 1, wherein
   low pass filter (LPF) inputs said steering torque, an said hardware controller further calculates an angle velocity index ranging between ±1.0 based on said motor angle velocity, and outputs said turning or returning state index by multiplying an output of said LPF and said angle velocity index.

3. The electric power steering apparatus according to claim 2, wherein
   said angle velocity index has a constant value when an absolute value of said motor angle velocity is larger than or equal to a predetermined value and changes linearly or nonlinearly when the absolute value of said motor angle velocity is smaller than said predetermined value.

4. The electric power steering apparatus according to claim 3, wherein
said hardware controller further multiplies said returning gain and said turning or returning state ratio to provide a second multiplication result, subtracts said turning or returning state ratio from a fixed value to provide a subtraction result, multiplies said subtraction result and said turning gain to provide a third multiplication result, and adds said second multiplication result and said third multiplication result to provide an addition result.

5. The electric power steering apparatus according to claim 4, wherein
said hardware controller further obtains an absolute value of said yaw rate estimation value, inverts a sign of said yaw rate estimation value and outputs an inverted sign value, multiplies said absolute value and said addition result to provide a fourth multiplication result, multiplies said inverted sign value and said fourth multiplication result to provide a filth multiplication result, and outputs said convergence control value based on said fifth multiplication result.

6. The electric power steering apparatus according to claim 2, wherein
said hardware controller further multiplies said returning gain and said turning or returning state ratio to provide a second multiplication result, subtracts said turning or returning state ratio from a fixed value to provide a subtraction result, multiplies said subtraction result and said turning gain to provide a third multiplication result, and adds said second multiplication result and said third multiplication result to provide an addition result.

7. The electric power steering apparatus according to claim 6, wherein
said hardware controller further obtains an absolute value of said yaw rate estimation value, inverts a sign of said yaw rate estimation value to provide an inverted sign value, multiplies said absolute value and said addition result to provide a fourth multiplication result multiplies said inverted sign value and said fourth multiplication result to provide a fifth multiplication result, and outputs said convergence control value based on said fifth multiplication result.

8. The electric power steering apparatus according to claim 1, wherein
said hardware controller further multiplies said returning gain and said turning or returning state ratio to provide a second multiplication result, subtracts said turning or returning state ratio from a fixed value to provide a subtraction result, multiplies said subtraction result and said turning gain to provide a third multiplication result, and adds said second multiplication result and said third multiplication result to provide an additional result.

9. The electric power steering apparatus according to claim 8, wherein
said hardware controller further obtains an absolute value of said yaw rate estimation value, inverts a sign of said yaw rate estimation value to provide an inverted sign value, multiplies said absolute value and said addition result to provide a fourth multiplication result, and multiplies an output of inverted sign value said fourth multiplication result to provide a fifth multiplication result, and outputs said convergence control value based on said fifth multiplication result.

* * * * *